Jan. 10, 1928.
T. L. FAWICK
1,655,497
TRANSMISSION
Filed Aug. 16, 1926    3 Sheets-Sheet 1
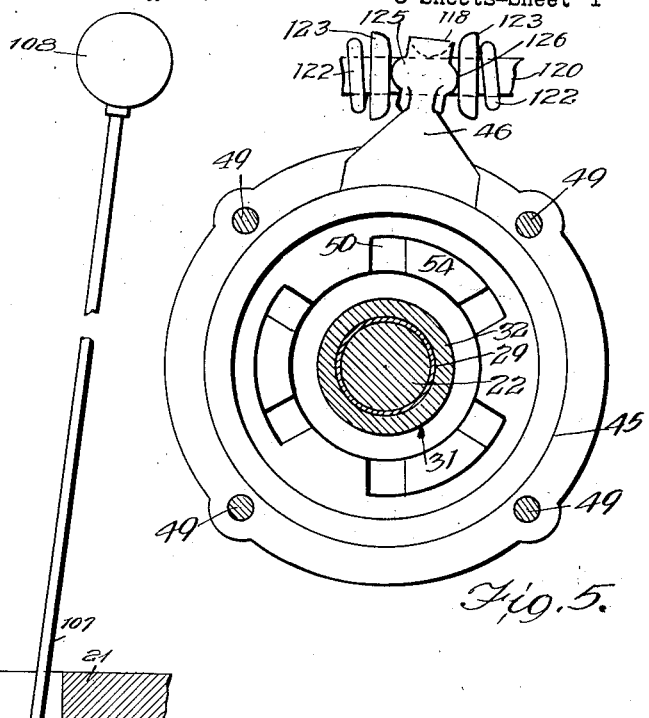
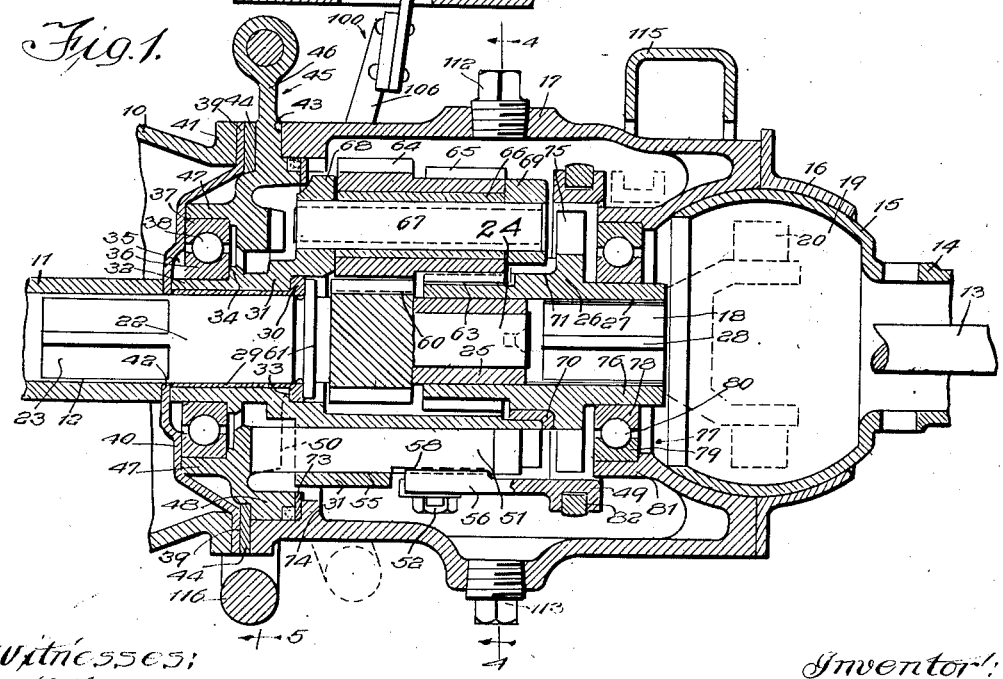
Witnesses:
William P. Kilroy
Harry R. White
Inventor:
Thomas L. Fawick
Brown Borreaus Denner
By
Attys

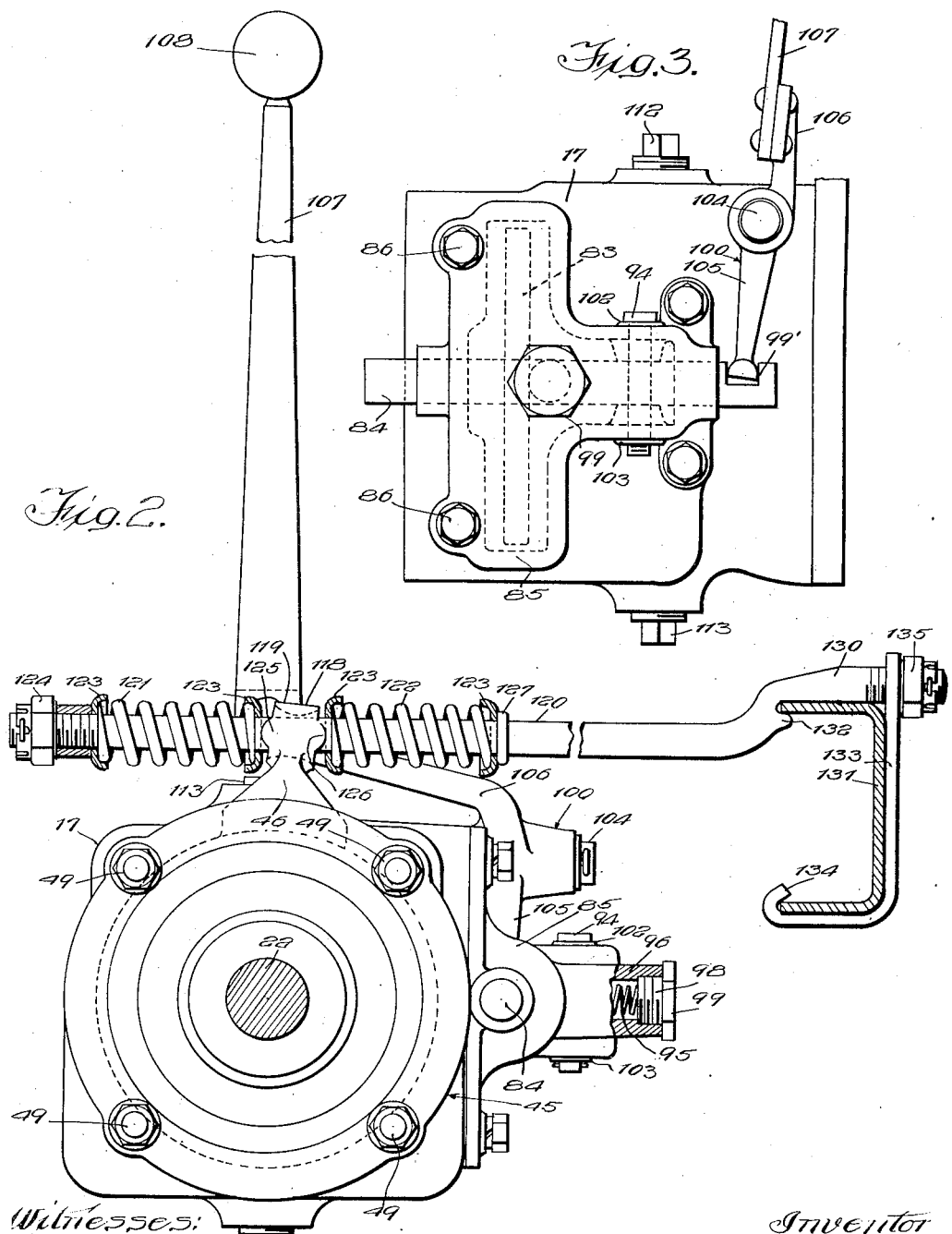

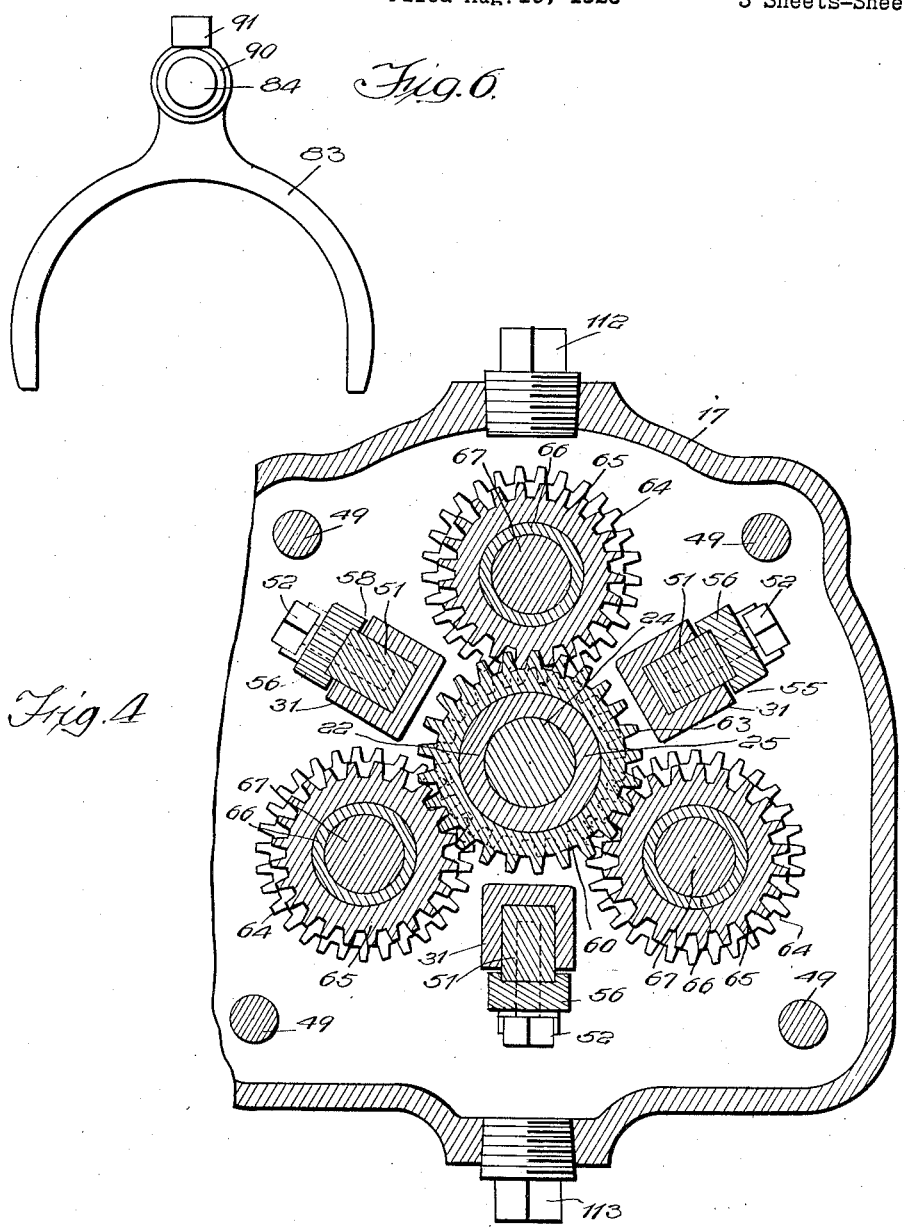

Patented Jan. 10, 1928.

1,655,497

UNITED STATES PATENT OFFICE.

THOMAS L. FAWICK, OF RACINE, WISCONSIN.

TRANSMISSION.

Application filed August 16, 1926. Serial No. 129,308.

This invention pertains in general to change speed gearing and more particularly to a transmission adapted to be used in conjunction with any of the well known types of accelerating and reverse transmissions employed in automobiles to provide for a greater range of variation in the driving ratio between the engine and the rear axle of a motor vehicle.

My present invention, although of the same general type as that disclosed in each of my co-pending patent applications Serial Numbers 74,813 and 75,194, filed December 11, 1925, and December 14, 1925, respectively, embodies several radical improvements not found in my earlier applications, which result in a decidedly simpler and more rugged transmission.

A transmission such as I propose may be utilized to secure either the so called "under drive" or "over drive", and it is to be understood that, although I shall describe my invention as applied to a specific form in which the ratio between the engine and rear axle speeds is increased for an "under drive", it is not to be limited to this application for it may be equally well used to decrease the ratio to give the "over drive" effect.

Specifically, my invention constitutes an improvement over the transmission disclosed in my previously mentioned co-pending application Serial Number 74,813. The present construction differs from the aforesaid transmission in that I now provide a resilient mounting for the clutch member connected to the frame or housing. This mounting, due to its resiliency, is adapted to compensate for the jars incident to the meshing of the clutch bars of the cage with the clutch sockets of this clutch member. This eliminates to a considerable extent the chattering and noise present during the operation of the clutch parts. Also, the wear and tear on the clutch parts is greatly reduced and their longevity is obviously increased.

In accordance with the general features of my invention, I provide a clutch member connected to the gear housing adapted, when the clutch bars of the gear cage are in mesh with the clutch sockets thereof, to prevent the gear cage from rotating. This clutch member is not fastened to the gear casing, but is resiliently connected to the chassis of the motor vehicle by means of a pair of opposed compression springs adapted to react upon movement of the clutch member to compensate for the jars incident to the meshing of the clutch bars with the clutch sockets formed in the clutch member.

Other objects and advantages of my invention will more fully appear from the following detail description taken in connection with the accompanying drawings, which illustrate one embodiment thereof and, in which:—

Figure 1 is a fragmentary sectional view taken through a transmission embodying the features of my invention;

Figure 2 is an end elevation taken from the left side of the construction shown in Figure 1, illustrating the compensating springs;

Figure 3 is a side elevation taken from the right side of the construction shown in Figure 2;

Figure 4 is a fragmentary sectional view taken on substantially the line 4—4 of Figure 1, looking in the direction indicated by the arrows;

Figure 5 is a view partly in section taken on the line 5—5 of Figure 1;

Figure 6 is a detail view illustrating the construction of the fork member; and

Figure 7 is a fragmentary section through the shifter fork and connected parts.

Referring now to the drawings in detail, in which like reference numerals designate similar parts throughout the several views, 10 denotes generally a casing for the usual accelerating and reverse transmission of an automobile. In the present modification of my invention, I have illustrated my improved transmission as being applied to the driving system of a Ford automobile. The casing 10 serves to house the usual planetary type of transmission which is used on a Ford. Extending from the casing 10 is a tubular shaft 11 having a squared socket 12. Positioned in axial alignment with the shaft 11 is the propeller shaft 13 which is disposed in a torque tube 14 of well known construction. The end of the tube 14, shown in Figure 1, is spherical in shape as indicated at 15. Also, the spherical portion 15 is disposed within an arcuate shaped retaining element 16 which is suitably fastened to a gear casing 17.

The propeller shaft 13 is connected to a shaft 18 by means of a universal coupling 19 positioned within the spherical portion 15 of the tube 14. For purposes of simplicity in the explanation of my invention, I have only shown one of the coupling members 20. The coupling 19 is of any usual or conventional construction and does not, per se, constitute a part of my invention.

The casing 17 serves to house my novel auxiliary transmission and is suitably connected to the gear casing 10, as will be more fully described hereinafter in detail. This casing 17 is disposed below the floor board 21 of the motor vehicle and is readily accessible for purposes of inspection and repair.

Located between the shaft 11 and the propeller shaft 13 (Figure 1) is an intermediate shaft 22 having a squared end 23 fitted in the squared socket 12. The other end of the shaft 22 is considerably reduced, as indicated at 24, and is positioned within a bearing 25 which telescopes a portion of the toothed element 26. The element 26 has a squared socket 27 in which the squared end 28 of the shaft section 18 is fitted.

Surrounding a portion of the shaft 22 adjacent the shaft 11 is a bushing 29 having an enlarged annular portion 30. Encircling this bushing 29 is the hub portion 32 of a cage 31. This cage 31 is provided with an annular shoulder 33 against which is the portion 30 of the bushing 29. The hub portion 32 is provided with an annular shoulder 34 abutting the lower race 36 of a ball bearing unit 35. This unit 35 surrounds the hub portion 32 and includes an inner race 36, an outer race 37, and a plurality of anti-frictional elements or balls 38. The outer race 37 is held against movement in one direction by a cover plate 40 which is annular in shape and is provided with an annular flange 39. This flange 39 abuts an annular flange 41 formed integral with the casing 10. The plate 40 also is equipped with a substantially annular flat portion 42 which extends into a space separating the end of the shaft 11 from the end of the hub portion 32, as shown in Figure 1. It should be noted that this portion 42 abuts both the end of the bushing 29 and the end of the hub portion 32.

Positioned within the gear casing 17 and surrounding the hub portion 32 of the cage 31 is a clutch member 45 having a lateral extension 46 positioned between the end of the casing 17 and the flanges 41 and 39, previously described. Located between the end of the casing 17 and the flange 41 of the casing 10 is an annular element or washer 44 which at its uppermost portion abuts the lateral extension 46 of the clutch member 45. It should be noted that the lateral extension 46 in reality extends through a slot 43 formed in the upper portion of the casing 17.

The clutch member 45 is provided with a cup shaped portion 47 in which is seated the outer race 47 of the ball bearing unit 35. The end of this cup shaped portion 47 abuts the cover plate 40. The clutch member 45 is also equipped with a substantially annular portion 48 which abuts the inner wall of the casing 17 and serves to maintain the clutch part 45 in its proper position. The casing 17 is tightly fastened to the annular flange 41 of the casing 10 by means of a plurality of bolts or studs 49, preferably four in number, as best shown in Figure 2. These studs 49 extend clear through the casing 17 and may be removed with facility whenever it is desired to detach the casing 17 from the casing 10.

The clutch member 45 has a series of preferably six recesses 50 which form clutch sockets for receiving the ends of a series of three clutch bars 51, which are connected to the shiftable cage or ring 49 by suitable screws or bolts 52, as shown in Figure 1. Each clutch socket 50 extends far enough to receive the end of the associated clutch bar 51 and, in fact, may be milled or cut quite through the wall of the clutch member 45, so as to provide a sufficiently large bearing or shoulder for engaging the bar. Between the clutch socket 50 the metal of the clutch member 45 is left standing the full thickness of the plate or body, with the exception of alternate clutch portions indicated by the reference character 54 (Figure 5). At these alternate clutch portions 54 the intervening metal is cut down to substantially half the depth of the clutch socket in order to assist the clutch bars 51 in proceeding in the adjacent sockets 50, as will be more fully explained hereinafter.

As best shown in Figures 1 and 4, the clutch bars 51 extend through suitable apertures 55, formed in the cage 31. The three bars 51 are reciprocably mounted and are fastened to three fingers 56 formed integral with the previously mentioned ring 49. These fingers 56 are fastened to the bars 51 by means of the bolts 52. The cage 31 is cut away at the finger end of each bar 51, forming a slot 58 for receiving the corresponding end of the finger 56. The bars 51, although shown in Figure 4 as being rectangular in shape, may be made of any other suitable or desirable form.

The three bars or rods 51 are positioned around the end of the shaft 22, which has formed thereon a pinion 60 (Figure 1). Also the shaft 22 has formed integral therewith an annular shoulder 61 which abuts the enlarged portion 30 of the bushing 29 and serves to retain the bushing in place. The reduced end 24 of the shaft 22, as previously described, telescopes the end of the clutch element 26 which is fastened to the coupling element 28 connected to the propeller shaft 13. The clutch element 26 (Figure 1) has formed integral therewith a pinion 63 disposed around the reduced end 24 of the shaft 22.

The pinions 60 and 63 are at all times in mesh with three sets of epicyclic pinions 64 and 65, respectively, carried by the cage 31. Each set of two pinions 64 and 65 are formed integral and are loosely mounted on a bushing 66 carried by a pin 67 connected to the portion 68 of the cage 31. The right hand end 69 of the cage 31 abuts an annular bearing surface 70 mounted on an annular shoulder 71 formed integral with the clutch element 26. Also, it should be noted, at this time, that the clutch member 45 through its annular portion 48 abuts a ring like element 73 disposed against an annular shoulder 74 formed integral with the casing 17. This shoulder 74 serves to maintain the clutch member 45 in its correct vertical position. The clutch element 26 is provided with a plurality of clutch sockets 75 adapted to mesh with the ends of the shiftable clutch bars or rods 51, for the purpose of enabling a direct drive between the shaft 11 and the propeller shaft 13. From the foregoing, it will be obvious that when the cage 31 is clutched to the part 45 the individual sets of pinions 64 and 65 will rotate about their axes with the pinions 60 and 63, whereas the cage 31 will be maintained in a stationary position. On the other hand, when the cage is clutched to the element 26 the cage 31 will rotate as a unit with the shaft 22 resulting in a direct drive between the shaft 22 and the propeller shaft 13. This action will be more fully explained hereinafter.

The clutch element 26 is provided with a hub portion 76 which encircles the shaft 18. This portion 76 is journaled in a ball bearing designated generally by the reference character 77. The ball bearing 77 comprises inner and outer races 78 and 79 and a plurality of anti-frictional elements 80. This ball bearing unit is positioned between the hub portion 76 and an annular or cup-like portion 81 formed integral with the casing 17.

Referring now to the ring-like element 49, it will be evident that this element is provided with an annular groove 82 in which is fitted the fork member 83. The fork member 83, as is obvious from Figure 3, is mounted on and secured to a longitudinal shaft 84 which is reciprocably journaled in an auxiliary supplemental casing 85 fastened to one side of the main casing 17. It is, of course, to be understood that the applicant is not to be limited to this particular casing construction for instead of employing two casings, such as casings 17 and 85, a single casing might be employed for housing the requisite parts. The casing 85 is preferably secured to the housing 17 by means of a plurality of bolts 86. This arrangement enables the transmission to be readily disassembled for purposes of inspection and replacement of parts.

Referring to Figure 7, it will be observed that the fork member 83 is equipped with a hub portion 90 which is adapted to be fastened to a portion of the shiftable shaft or rod 84 by means of a set screw 89. The hub portion 90 is equipped with a raised portion or bump 91 adapted to be engaged by the tapered portion 92 of a pawl or lever 93 pivotally mounted upon a pin 94 secured to the inner wall of the extension 96 of casing 85. The pin or rod 94 extends through bosses 102 and 103 formed in the extension 96. The tapered end of the lever 93 is urged into engagement with the raised portion 91 by means of a compression spring 95 positioned in the circular extension 96. The inner end of this spring 95 is held in place by a small lug 97 formed integral with the lever 93, and the outermost end of the spring 95 is maintained in place by a stud 98 threaded into the extension 96. The stud 98 is equipped with a hexagonal head 99 by which it may be removed from the extension 96 with facility for the purpose of access to the spring. This spring 95 is adapted to cause the fork member 83 to be locked into the position to which it is moved by the rod 84. This insures that the cage 31 will be locked in either of its two positions.

One end of the rod 84 (Figure 3) is equipped with a slot or aperture 99' into which the lower end of a lever 100 extends. The lever 100 is pivotally mounted upon a pin 104 carried by the casing 17. The lever proper comprises a downwardly extending leg 105 and an offset upwardly extending leg 106 which is fastened to the lower end of a shifting rod 107 equipped with a ball 108 at its upper end. This shifting arm 107 extends through an aperture 109 formed in the floor board 21 (Figure 1). By moving the shifting arm 107 the shaft or rod 84 may be reciprocated to move the bars or rods 51 longitudinally in the casing 17. The shifter mechanism herein disclosed embodies the novel feature first disclosed and claimed in my copending application Serial No. 75,194, filed December 14, 1925, in that the shifter arm 107 comprises a relatively thin flat piece of resilient metal which cooperates with the snap mechanism comprising the spring follower 92 and the hump or cam 91. In shifting from one position to another, it is desirable to make the transfer of position as rapidly as possible so that the parts will not acquire too great a difference in motion during the shifting operation. Hence, movement of the ball handle 108, for example, to the left as shown in Figure 1, tends to throw the shifter rod 84 to the right as viewed in Figure 7, such tendency being opposed by the spring follower 92 and the flexible portion 107 being flexed or bent until sufficient pressure is applied to the rod 84 to overcome the static friction which the follower 92 imposes upon the cam 91. After the parts begin to move, the ball 108 to which the operator's hand is applied, lies considerably in advance of the neutral position, the shaft 107 being flexed, so that when the shifter rod 84 once starts to move it snaps past the neutral position and the follower 92 rides on the opposite side of the cam 91, with the result that the spring 45 is able to throw the shifter rod 84 ahead without opposition from the hand of the operator, thereby securing a very desirable quick snap throw unimpeded by the hand of the operator on the ball 108.

The casing 17 is equipped with a pair of removable threaded plugs 112 and 113 disposed substantially centrally of the casing. By removing the plug 112 a suitable lubricant may be poured into the casing 117. The plug 113 constitutes a drain plug for the casing. Also, in Figure 1, in order to show the manner in which my transmission is associated with the chassis of a Ford, I have illustrated the cross frame member of the Ford chassis and have designated it by the reference character 115. The reference character 116 designates the brake shaft of the Ford which is positioned in proximity to the lower part of the casing 10. These two parts 115 and 116 do not per se constitute a part of my invention and their illustration in the present application serves only to show that the device of my invention may be installed without conflicting with existing requirements.

I shall now proceed to describe in detail the principal feature of the present invention which pertains to the resilient mounting for the clutch part 45 which serves to maintain the cage 31 stationary with respect to the rotating shaft sections. In my co-pending patent application, Serial No. 74,813, this clutch part was fastened to the casing associated therewith. Although this arrangement was satisfactory for some purposes, still the wear on the clutch parts was excessive and the present construction was devised with the view of eliminating noise and for increasing the longevity of the clutch parts.

The lateral extension 46 of the clutch part 45 extends above the casing 17 and has an enlarged apertured part 118. This part 118 is provided with an aperture 119 through which extends a shaft or rod 120. The end 118 of the part 45 is loosely mounted on this shaft 120 so that it may be rocked thereon. Encircling the shaft 120 are a pair of spaced compression springs 121 and 122 whose ends are disposed in cup-like washers 123 loosely mounted upon the shaft. One of the washers 123 associated with the spring 121 abuts a hexagonal castellated nut member 124 threaded on an end of the shaft 120. The other washer 123 associated with the spring 121 is urged into engagement with a cam-like portion 125 formed integral with the extension 46. The extension 46 is also provided with another cam-like portion 126 which abuts a washer 123 associated with the spring 122. The other washer associated with the spring 122 abuts a shoulder 127 formed integral with the shaft 120. The shaft 120 is provided with an offset portion 130 adapted to lie on top of a frame member 131 of the Ford chassis. This end of the rod or shaft 120 is also equipped with a hook portion 132 adapted to engage over one of the legs of the channel frame member 131. Also, the end 130 extends through an aperture in a downwardly extending element 133, which has a hook portion 134 for engaging the other leg of the U-shaped channel beam 131. This plate 133 is tightly fastened to the beam 131 by means of a castellated nut 135 threaded upon the end 130 of the rod 120. This nut 135 serves to draw the two hook portions 132 and 134 into tight engagement with the legs of the U-shaped beam 131 to secure the rod 120 thereto.

From the above description and the illustration in Figure 2, it will now be evident that the two springs 121 and 122 are adapted to urge the lateral extension 46 in opposite directions depending upon the direction in which the shaft 22 is revolving. These springs 121 and 122 compensate for the jars incident to the meshing of the clutch bars 51 with the clutch socket formed in the clutch member 45. That is to say, when the clutch bars 51 are shifted longitudinally to disengage them from the clutch element 26, they are still rotating with the cage 31, and upon their meshing with the clutch socket formed in the clutch part obviously the cage 31 will tend to actuate the clutch parts 45. This tendency is compensated for by the two previously described springs.

The operation of my present device is substantially like that of the construction disclosed in my co-pending application, Serial No. 74,813, with the exception of the previously described compensatory action with reference to the clutch part 45. Now, when the clutch bars 51 are in the position shown in Figure 1, or in other words, in engagement with the clutch sockets 50 of the clutch part 45, the cage 31 will be maintained stationary and the drive will be effected through the train of epicyclic pinions described previously. This position of the parts will result in an indirect drive between the shaft 22 and the shaft 18, which is connected to the propeller shaft 13. In the form of my invention shown on the accompanying drawings, the ratio between engine and rear axle speeds is increased to get an "under drive", but it is, of course, to be understood that the ration may be decreased to give an "over drive" effect without deviating from the features of my invention.

By disengaging the clutch bars 51 from the socket 50 and the clutch parts 45, the clutch part 50 may be moved into a neutral position. The movement of the parts 51 is accomplished by the actuation of the shifting arm 107 through the shifting fork 83 previously described. Also, I desire it understood that although I have not disclosed any means for maintaining the shifting arm 107 in a neutral position, the same could be added to my present construction without changing the general construction of my present transmission. By moving the shift lever 107 to the left (Figure 1), the bars or rods 51 may be made to mesh with the sockets 75 formed in the clutch element 26. This will result in the cage and the pinions rotating as a unit with the shaft 22. In other words, when the clutch bars 51 are in mesh with the sockets 75 of the element 26 a direct drive between the shaft 22 and the shaft 18 will result. When the cage 31 is rotating with the shaft 22, the pinions 64 and 65 merely roll around on the pinions 60 and 63 connected to the two shaft sections 22 and 18.

When it is desired to have an indirect drive, the clutch bars 51 are moved out of engagement with the clutch element 26 towards the clutch member 45. Upon the ends of the clutch bars engaging the surface of the clutch member 45, they will first enter the depressions 54 before proceeding into the associated sockets 50. In other words, these depressions 54 assist the clutch bars in proceeding into the sockets. Now, obviously, should the cage 31 be rotating when the clutch bars are moved into engagement with the clutch member 45, there will be a tendency for the clutch member 45 to be moved in the direction of the rotation of the cage. If there were no means provided for compensating for this effect the ends of the clutch bars 51 would suffer greatly from the jars. Also, there would be considerable noise and chattering when the clutch bars were brought into engagement with the clutch member 45.

I compensate for these jars by providing a resilient mounting for the clutch member 45. Any movement imparted to the clutch member 45 will be transmitted to one of the compression springs which will react to counteract the tendency of the cage 31 to carry the clutch parts 45 forward with it. The two springs 121 and 122 serve at all times to urge the lateral extension 46 into a substantially central position. Obviously, any movement of this clutch member 45 will be counteracted by the springs 122 and 121. Thus it will be seen that I have provided an ideal mechanism for eliminating the noise and chattering incident to the meshing of the clutch parts, and also for compensating for the jars which the clutch parts are subjected to in operation.

The specific form of the spring buffer mechanism may vary without departing from my invention.

I claim:—

1. In combination, a housing, a clutch member associated with the housing, a resilient mounting associated with the said clutch member, a pair of aligned shafts, a pair of gears one being on each of said shafts, a gear cage associated with the gears, a plurality of epicyclic pinions connected to the cage and meshing with said gears, a shiftable rod connected to the said cage, and means for shifting the said rod to clutch the cage to one of said shafts to cause the cage to rotate about the shaft, and to clutch the said rod to the said clutch member to maintain the cage substantially stationary, said resilient mounting serving to take up the jars incident to the meshing of the rod with the clutch member to prevent the rotation of the cage.

2. In combination, a housing, a driving element, a driven element, a third gear connected to said driving element, a second gear connected to said driven element, a gear cage associated with the said two gears, a plurality of epicyclic pinions rotatably connected to the said cage and meshing with said gears, clutch means associated with the housing, a shiftable rod connected to the cage, means for shifting the rod to clutch the cage to one of the said two elements for a given drive between the said two elements and to clutch the rod to the said clutch means for a different driving ratio between said elements, and resilient means associated with the said clutch means for compensating for the jars incident to the meshing of the shiftable rod with the clutch means associated with the housing.

3. In a transmission, a housing having a clutch member, a pair of aligned shafts, a pair of gears one being on each of said shafts, a gear cage associated with the gears, a plurality of epicyclic pinions connected to the cage and meshing with said gears, a shiftable rod connected to the said cage, means for shifting the rod to clutch the cage to one of said shafts for a direct drive between the shafts and to clutch the rod to said clutch member for an indirect drive between said shafts, and resilient means associated with the said mounting member for compensating for the jars incident to the clutching of the shiftable rod therewith, said means including a stationary rod extending through a portion of the said clutch member and a pair of compression springs mounted on the said rod, one on each side of the said portion of the clutch member for urging the clutch member into a mid-way position between the springs.

4. In a transmission, an accelerating and reverse transmission, a housing for the same, an auxiliary transmission associated therewith, a casing for said auxiliary transmission connected to said housing, a clutch member positioned between the adjacent ends of said casing and housing, said auxiliary transmission including a gear cage having epicyclic pinions mounted thereon and means for clutching the cage to the clutch member, and means associated with the said clutch member for compensating for the jars incident to the clutching of the cage to the member.

5. In combination, an accelerating and reverse transmission, a housing therefor, an auxiliary transmission associated therewith, a casing for said auxiliary transmission connected to said housing, a clutch member positioned between the housing and casing, said auxiliary transmission comprising a pair of aligned shafts, a pair of gears, one being mounted on each of said shafts, a gear cage associated with the said gears, a plurality of epicyclic pinions carried by the said cage and meshing with the said gears, and means for clutching the cage to the said clutch member to obtain a given driving ratio between said shafts, and resilient means connected to a portion of said clutch member externally of the casing and housing for resisting movement of the same when the cage is clutched to the member.

6. In combination, a gear cage, a clutch member, means for clutching the cage to the member, and means connected to the member for compensating for the jars incident to the clutching of the cage with the member, said means including a rod connected at one end to the said member, a U-shaped channel beam associated with the other end of the rod, said other end of the rod being adapted to lie over a leg of said U-shaped channel beam, said end of the rod having a hook portion fitted over the top edge of said leg, a bent element secured to said end of the rod extending along the bottom of said means and having a portion bent along the side of the other leg of said beam, said bent portion having a hook for engaging over the top edge of the leg associated therewith, and a single fastening means for securing the bent element to said rod and for tightly drawing the hooks into engagement with the legs of the beam to secure the rod thereto.

7. In combination, a first shaft, a second shaft, a relatively stationary clutch member, a clutch member connected to one of said shafts, pinions on the shafts, a gear cage associated with the pinions, pinions journaled in the cage and meshing with said other pinions, slidable clutch elements carried by the cage and adapted to project from either end of the cage to engage one of the clutch members, and means associated with the stationary clutch member for compensating for the jars incident to the clutching of the cage to said member.

8. In combination, a closed gear case, a driving and a driven shaft having bearings in said gear case, a rotatable carrier having a plurality of planet gears for connecting said shafts, the driven shaft section having a flange bearing jaw clutch teeth adjacent one end of the cage, a relatively stationary jaw clutch member mounted for limited rotary motion in the housing, spring means for restraining said motion, and longitudinally slidable clutch means carried with the cage, said clutch means being projectible beyond the one end of the cage to engage the jaw teeth of the flange and projectible beyond the other end of the cage to engage the relatively stationary jaw clutch member.

In witness whereof, I hereunto subscribe my name this sixth day of August, A. D., 1926.

THOMAS L. FAWICK.